United States Patent
Li

(10) Patent No.: US 12,536,064 B2
(45) Date of Patent: Jan. 27, 2026

(54) METHOD AND SYSTEM FOR FAULT-TOLERANT DATA COMMUNICATION

(71) Applicant: Black Sesame Technologies (Chongqing) Co., Ltd., Chongqing (CN)

(72) Inventor: Hai Li, Shenzhen (CN)

(73) Assignee: Black Sesame Technologies (Chongqing) Co., Ltd., Chongqing (CN)

( * ) Notice: Subject to any disclaimer, the term of this patent is extended or adjusted under 35 U.S.C. 154(b) by 148 days.

(21) Appl. No.: 18/372,548

(22) Filed: Sep. 25, 2023

(65) Prior Publication Data

US 2024/0103964 A1    Mar. 28, 2024

(30) Foreign Application Priority Data

Sep. 28, 2022  (CN) .......................... 202211193440.4

(51) Int. Cl.
*G06F 11/10* (2006.01)
*G06F 11/07* (2006.01)

(52) U.S. Cl.
CPC .......... *G06F 11/10* (2013.01); *G06F 11/1068* (2013.01); *G06F 11/0796* (2013.01)

(58) Field of Classification Search
CPC .. G06F 11/10; G06F 11/1004; G06F 11/0796; G06F 11/1068
See application file for complete search history.

(56) References Cited

U.S. PATENT DOCUMENTS

| | | | | |
|---|---|---|---|---|
| 7,609,636 B1* | 10/2009 | Mott | ................... | H04L 49/9078 370/429 |
| 7,774,641 B2* | 8/2010 | Inoue | .................... | G06F 11/201 714/5.11 |
| 8,631,281 B1* | 1/2014 | Stripling | ................ | G11B 15/66 714/42 |

(Continued)

FOREIGN PATENT DOCUMENTS

| CN | 1957532 A | 5/2007 |
|---|---|---|
| CN | 104765650 A | 7/2015 |

(Continued)

*Primary Examiner* — Ashish Thomas
*Assistant Examiner* — Sebastian De Jesus Reyes
(74) *Attorney, Agent, or Firm* — Yao Legal Services, Inc.; Shun Yao

(57) ABSTRACT

The disclosure solves a problem of a poor ability in controlling and defending against a data error risk of a vehicle driving assistance system during data communication. The data processing method includes: creating a verification data chain for verifying vehicle-carried data of a target vehicle, where the verification data chain includes a plurality of check bits; and handling a communication error when the communication error is detected in the vehicle-carried data of the target vehicle based on the verification data chain. In the present application, when a data transmission process is subjected to interference or malicious attacks, it is possible to detect a communication error in communication data by the check bits and record the communication error, thereby achieving a purpose of controlling and defending against data error risks.

18 Claims, 8 Drawing Sheets

(56) References Cited

U.S. PATENT DOCUMENTS

| | | | | |
|---|---|---|---|---|
| 2009/0077426 A1* | 3/2009 | Liberty | ............... | G06F 11/0745 |
| | | | | 714/E11.002 |
| 2017/0361808 A1* | 12/2017 | Haga | .................... | B60R 25/307 |
| 2019/0220352 A1* | 7/2019 | Cha | .................. | G11C 29/56012 |
| 2020/0371783 A1* | 11/2020 | Kim | .................... | G06F 11/0739 |
| 2022/0286473 A1* | 9/2022 | Ujiie | .................... | B60R 16/023 |

FOREIGN PATENT DOCUMENTS

| | | | |
|---|---|---|---|
| CN | 108988990 | A | 12/2018 |
| CN | 110119327 | A | 8/2019 |
| CN | 112154621 | A | 12/2020 |

\* cited by examiner

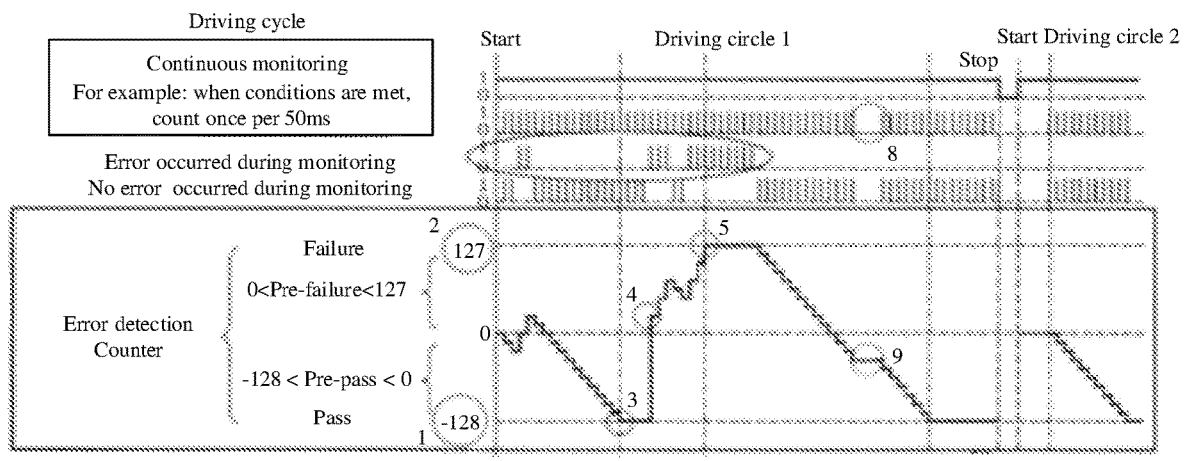
FIG. 9
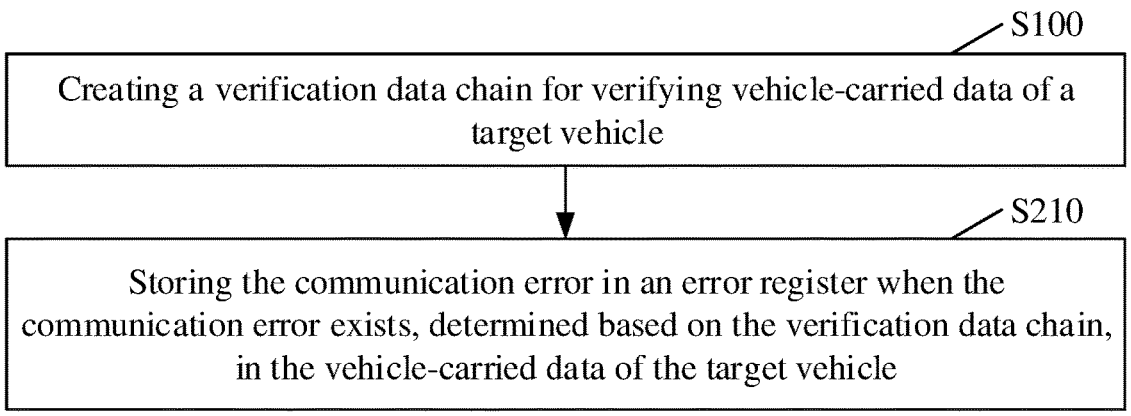
FIG. 10
| First byte | Second byte | Third byte | Fourth byte | Fifth byte | Sixth byte | Seventh byte | Eighth byte |
|---|---|---|---|---|---|---|---|
| A | E | 4 | 7 | E | 8 | 8 | 0 |
FIG. 11

METHOD AND SYSTEM FOR FAULT-TOLERANT DATA COMMUNICATION

RELATED APPLICATION

This application claims the benefit under 35 U.S.C. § 119(a) of the filing date of Chinese Patent Application No. 202211193440.4, filed in the Chinese Patent Office on Sep. 28, 2022. The disclosure of the foregoing application is herein incorporated by reference in its entirety.

TECHNICAL FIELD

The present application relates to the field of communication technologies, and in particular, to a method and system for fault-tolerant data processing.

BACKGROUND

A vehicle driving assistance system, by using an in-vehicle Ethernet network, cooperates with various devices such as in-vehicle sensors, controllers and actuators, to achieve information exchange and sharing among each other, thereby achieving safe, efficient, comfortable, and energy-saving automatic or semi-automatic driving.

During a communication process of the in-vehicle Ethernet network, a potential random physical failure or a logical failure of the system may lead to a data communication error. In the prior art, in order to ensure real-time communication, communication data streams are fused to reduce a communication load. However, error detection of communication data, and controlling and defending against a data error risk through a communication error are poorly considered, thereby failing to improve an anti-interference ability.

SUMMARY

In view of this, embodiments of the present application are dedicated to providing a data processing method and system, a storage medium and an electronic device to solve a problem of a poor ability in controlling and defending against a data error risk in a vehicle driving assistance system during data communication in the prior art.

In a first aspect, an embodiment of the present application provides a data processing method, including: creating a verification data chain for verifying vehicle-carried data of a target vehicle, where the verification data chain includes a plurality of check bits; and handling a communication error when the communication error is detected in the vehicle-carried data of the target vehicle based on the verification data chain.

According to the first aspect, in certain implementations of the first aspect, before handling the communication error when the communication error is detected in the vehicle-carried data of the target vehicle based on the verification data chain, the method further includes at least one of the following: checking, based on the plurality of check bits in the verification data chain, whether the communication error exists in the vehicle-carried data of the target vehicle; checking, based on data information of the verification data chain, whether the communication error exists in the vehicle-carried data of the target vehicle; and checking, based on reception of the verification data chain, whether the communication error exists in the vehicle-carried data of the target vehicle.

According to the first aspect, in certain implementations of the first aspect, the plurality of check bits includes at least one of the following: a head check bit of the verification data chain, located at a head of the verification data chain and configured to record basic information of the verification data chain; an end check bit of the verification data chain, located at an end of the verification data chain and configured to perform a weighting calculation on the plurality of check bits; an error check bit of the verification data chain, configured to report an error status of the verification data chain; and a feedback check bit of the verification data chain, obtained by a coupling calculation performed on the head check bit, the end check bit, and the error check bit of the verification data chain.

According to the first aspect, in certain implementations of the first aspect, checking, based on the plurality of check bits in the verification data chain, whether the communication error exists in the vehicle-carried data of the target vehicle includes: determining whether a payload ID of the verification data chain is correct through a parity check of the payload ID to check whether the communication error exists in the vehicle-carried data of the target vehicle; verifying a parameter of the verification data chain to check whether the communication error exists in the vehicle-carried data of the target vehicle; and determining whether the verification data chain is abnormal by verifying the plurality of check bits of the verification data chain to check whether the communication error exists in the vehicle-carried data of the target vehicle.

According to the first aspect, in certain implementations of the first aspect, checking, based on data information of the verification data chain, whether the communication error exists in the vehicle-carried data of the target vehicle includes: performing information comparison between the verification data chain and a verification data chain of a previous communication to obtain comparison data, when the verification data chain is determined as a detectable communication of data chain; and performing an adaptation process of error information on the comparison data and a preset comparison threshold to check whether the communication error exists in the vehicle-carried data of the target vehicle.

According to the first aspect, in certain implementations of the first aspect, checking, based on reception of the verification data chain, whether the communication error exists in the vehicle-carried data of the target vehicle includes: starting counting by using a counter when a wrong data signal is received; and determining that the communication error exists in the vehicle-carried data of the target vehicle when a count value of the counter reaches a preset counting threshold.

According to the first aspect, in certain implementations of the first aspect, handling the communication error includes: storing the communication error in an error register, where the communication error includes an error status recorded in a form of an error code.

According to the first aspect, in certain implementations of the first aspect, the verification data chain is transmitted through a linked list of verification data, where the linked list of verification data is configured to be dynamically expanded based on a size of the verification data chain.

According to the first aspect, in certain implementations of the first aspect, before handling the communication error when the communication error is detected in the vehicle-carried data of the target vehicle based on the verification data chain, the method further includes: performing a parity check on the verification data chain during a reset process or a register writing process, to check whether the communication error exists in the vehicle-carried data of the target vehicle.

According to the first aspect, the handling a communication error further includes: generating a parity interrupt to handle the communication error.

According to the first aspect, in certain implementations of the first aspect, before handling the communication error when the communication error is detected in the vehicle-carried data of the target vehicle based on the verification data chain, the method further includes: performing a parity check on an IP address of the verification data chain when the IP address of the verification data requires the parity check, to check whether the communication error exists in the vehicle-carried data of the target vehicle.

In a second aspect, an embodiment of the present application provides a data processing system, including: a creation module, configured to create a verification data chain for verifying vehicle-carried data of a target vehicle, where the verification data chain includes a plurality of check bit; and a handling module, configured to handle a communication error when the communication error is detected in the vehicle-carried data of the target vehicle based on the verification data chain.

In a third aspect, an embodiment of the present application provides a non-transitory computer-readable storage medium, configured to store a computer executable instruction, where when the executable instruction is executed by a processor, the data processing method according to the first aspect is implemented.

In a fourth aspect, an embodiment of the present application provides an electronic device, including: a processor; and a memory, configured to store an executable instruction of the processor, where the processor is configured to perform the data processing method according to the first aspect.

According to the data processing method provided by the embodiments of the present application, by creating a verification data chain, a communication error may be detected and handled through a plurality of check bits in the verification data chain, so that a data error risk may be controlled and defended, thereby ensuring integrity and functional safety of a data chain, and further ensuring stability and consistency of data communication in a whole vehicle driving assistance system.

BRIEF DESCRIPTION OF THE DRAWINGS

FIG. 9 is a principled schematic diagram of reception check of a verification data chain according to the data processing method provided in FIG. 8.

FIG. 10 is a flowchart of a data processing method according to yet still another embodiment of the present application.

FIG. 11 is a schematic diagram of an error code according to an embodiment of the present application.

DETAILED DESCRIPTION

Figure 1:
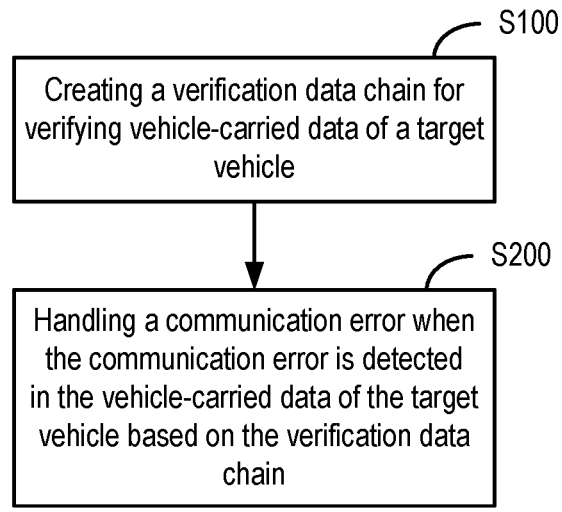
FIG. 1 is a flowchart of a data processing method according to an embodiment of the present application.

The technical solution in the disclosure will be described clearly and completely below with reference to the accompanying drawings in the disclosure. Obviously, the described embodiments are part of the embodiments of the disclosure, not all of them. Based on the embodiments in the disclosure, all other embodiments obtained by those skilled in the art without doing creative work fall in the scope of protection in the disclosure.

Data transmission from memory to memory, from memory to peripheral devices, from peripheral devices to memory, and from peripheral devices to peripheral devices is performed in a vehicle driving assistance system through various in-vehicle sensors, controllers, and actuators, to achieve a purpose of perceiving a surrounding environment of a vehicle. Based on information obtained from perception, steering and speed of the vehicle are controlled to ensure a safe and reliable driving. Therefore, correct transmission of communication data between various sensors, control systems, and other onboard systems is closely related to a normal and safe driving of the vehicle. However, in a complex driving environment, there may be various electromagnetic signal interferences, air static electricity, or various internal and external disturbances caused by the control strategy of the electronic control unit itself, leading to communication abnormalities. Meanwhile, due to uncertainty of a working environment inside and outside the vehicle, the vehicle may encounter potential random physical failures or logical failures of the system, various electromagnetic signal interferences, signal crosstalk in printed circuit boards (PCB), air static electricity and other external interferences or communication anomalies caused by the control strategy of the electronic control unit itself, resulting in damage to laser radar sensors, millimeter wave sensors, and processors and further resulting in communication data loss. Therefore, it is particularly important to detect communication errors in the data communication of the vehicle driving assistance systems.

In the prior art, in order to ensure real-time communication, communication data streams are fused to reduce a communication load. However, error detection of communication data, and controlling and defending against a data error risk through a communication error are poorly considered. Therefore, it cannot be used in actual working scenarios of the vehicle driving assistance system.

To solve a problem of a poor ability of data communication in controlling and defending against the data error risk of the vehicle driving assistance system in the prior art, a data processing method is provided by embodiments of the present application.

It should be noted that an onboard embedded system architecture is adopted in an exemplary embodiment of the present application, with System On Chip (SOC) being a core processor responsible for the operation of application software and safety functions. And SOC transmits data with software and hardware of different modules dispersed within the vehicle to cooperate with an overall operation of the vehicle driving assistance system. The processor and system architecture used in this application is not specifically limited, and the SOC core processor mentioned is only used to illustrate a solution provided by the present application through exemplary embodiments.

FIG. 1 is a flowchart of a data processing method according to an embodiment of the present application. As shown in FIG. 1, the data processing method according to the embodiment of the present application includes the following steps.

Step S100: creating a verification data chain for verifying vehicle-carried data of a target vehicle.

Specifically, the verification data chain includes a plurality of check bits.

Exemplarily, the plurality of check bits includes at least one of the following: a head check bit of the verification data chain, an end check bit of the verification data chain, an error check bit of the verification data chain and a feedback check bit of the verification data chain. The check bits mentioned above will be given a further explanation below.

The head check bit of the verification data chain is located at a head of the verification data chain and configured to record basic information of the verification data chain.

The end check bit of the verification data chain is located at an end of the verification data chain and configured to perform a weighting calculation on a plurality of check bits.

The error check bit of the verification data chain is configured to report an error status of the verification data chain. Exemplarily, the error check bit of the verification data chain may be set to 1 when an error is detected in the verification data chain and be set to 0 when no error is detected.

The feedback check bit of the verification data chain is obtained by a coupling calculation performed on the head check bit, the end check bit, and the error check bit of the verification data chain. Exemplarily, the feedback check bit of the verification data chain may be obtained by performing coupling bit AND operation on the head check bit of the verification data chain and the end check bit of the verification data chain to obtain a value, and adding the value to a value of the error check bit of the verification data chain to obtain a value of the feedback check bit of the verification data chain as the last bit of the verification data chain.

The verification data chain for verifying the vehicle-carried data of the target vehicle is obtained by packaging data to be transmitted into a data chain, and adding the check bits mentioned above to the data chain.

In an embodiment of the present application, transmission of different verification data chains may be carried out through a linked list of verification data. The linked list of verification data is configured to be dynamically expanded based on a size of the verification data chain and may be configured independently. Therefore, transmission data inside the vehicle may also be protected, to prevent data transmission errors.

In addition, in an exemplary embodiment of the present application, data capacity and priority level of each data transmission channel may be pre-adapted. For example, a burst transmission size of a programmable maximum advanced microcontroller bus architecture (AMBA) for each data transmission channel may be configured in a specialized register and a channel with abnormal transmission data may be disabled and restarted timely, so that an abnormal data channel may be enabled after the abnormal data channel is restored. In this way, various problems of malicious program attacks and abnormal data interruptions may be suppressed to ensure that abnormal loss and incorrect execution of data may be prevented.

Step S200: handling a communication error when the communication error is detected in the vehicle-carried data of the target vehicle based on the verification data chain.

Specifically, different types of communication errors correspond to different processing methods. For example, when a verification error occurs in the verification data chain, a corresponding addressing code space for abnormal function may be entered to run a corresponding error processing program or the communication error may be stored in an error register.

According to the data processing method provided by the embodiment shown in FIG. 1, by adding check bits to data to be transmitted and packaging them to create a verification data chain, when a data transmission process is subjected to interference or malicious attacks, data may be restored to correct data and possible data communication errors may be quickly identified and handled timely and effectively through the added check bits, thereby facilitating subsequent correction or analysis of errors.

Figure 2:
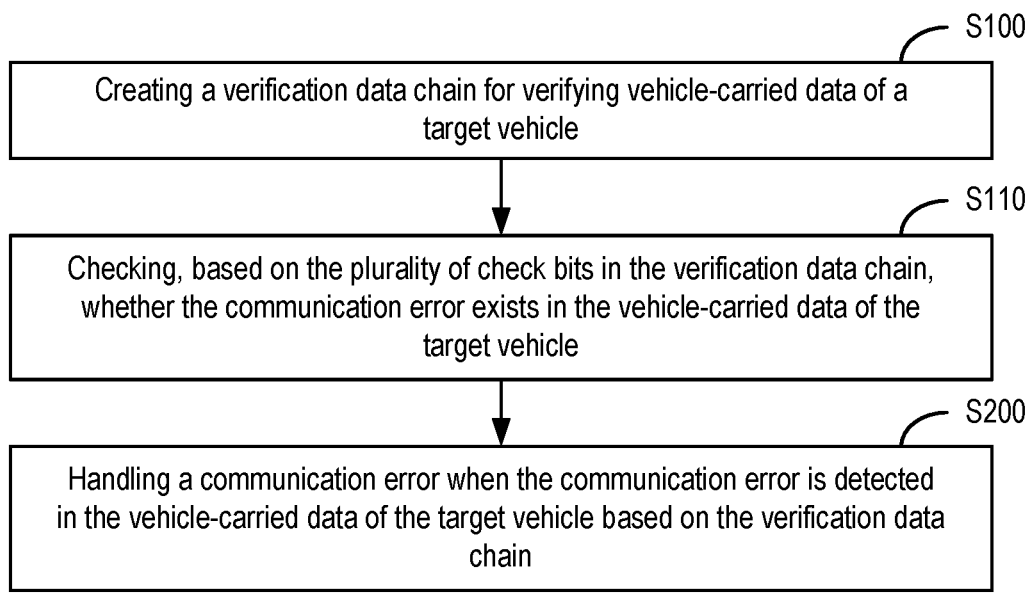
FIG. 2 is a flowchart of a data processing method according to another embodiment of the present application.

FIG. 2 is a flowchart of a data processing method according to another embodiment of the present application. The embodiment shown in FIG. 2 is an extension of the embodiment shown in FIG. 1. A difference between the embodiment shown in FIG. 2 and the embodiment shown in FIG. 1 will be described below, and similarities will not be described herein again.

As shown in FIG. 2, in this embodiment, before the handling a communication error when the communication error is detected in the vehicle-carried data of the target vehicle based on the verification data chain, the method further includes the following steps.

Step S110: checking, based on the plurality of check bits in the verification data chain, whether the communication error exists in the vehicle-carried data of the target vehicle.

Figure 3:
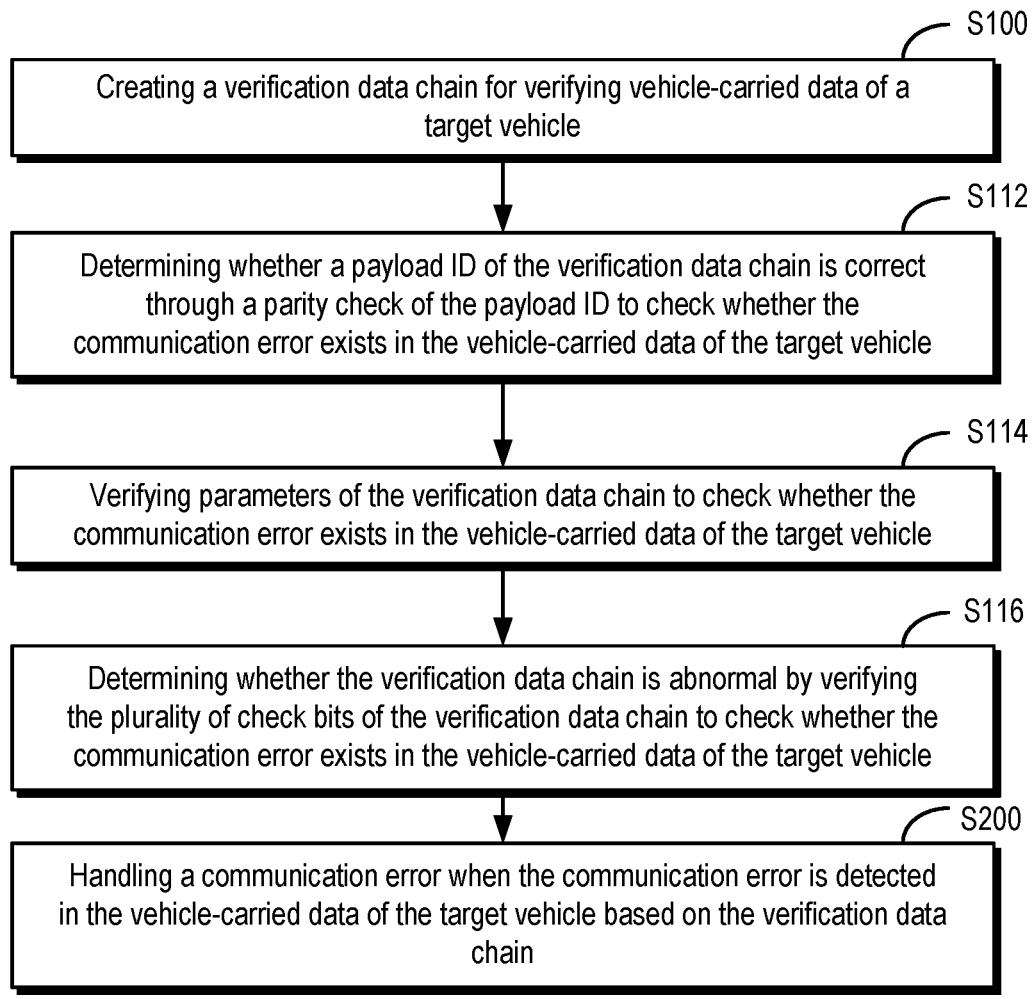
FIG. 3 is a flowchart of a data processing method according to still another embodiment of the present application.

In an exemplary embodiment of the present application, Step S110: checking, based on the plurality of check bits in the verification data chain, whether the communication error exists in the vehicle-carried data of the target vehicle includes the following steps shown in FIG. 3, and similarities with the embodiment shown in FIG. 2 are not described herein again.

Step S112: determining whether a payload ID of the verification data chain is correct through a parity check of the payload ID to check whether the communication error exists in the vehicle-carried data of the target vehicle.

Specifically, the payload ID corresponds to an ID number of a transmitting terminal of a data chain, and is configured to distinguish between different sending devices. If parity check of the payload ID is correct, the verification may be proceeded; if the payload ID parity check is incorrect, which indicates that the data chain verification is not passed, a next procedure of judgement may be performed based on an addressing code and the value of the error check bit of the verification data chain may be set to 1.

Step S114: verifying parameters of the verification data chain to check whether the communication error exists in the vehicle-carried data of the target vehicle.

Exemplarily, by determining whether a value of the payload ID of the data chain may support transmission performance of a corresponding external device, consistency between an inherent redundant data chain of a data chain transmission protocol and signal information of the data chain of each frame may be determined. When a determination result is no, effectiveness error of the data chain occurs. In this embodiment, this error may be reported to a faulty controller. In addition, the effectiveness error of the data chain will be defined with a corresponding IP value, which may be queued in a processing queue of the faulty controller. After the faulty controller handled the problem, a flag bit may be defined. The flag bit of data chain error includes a type of error and the IP value corresponding to the error.

If the effectiveness error of the data chain exists, a next procedure of judgement may be performed based on an addressing code and the value of the error check bit of the verification data chain may be set to 1; if the effectiveness error of the data chain does not exist, the verification may be proceeded.

Exemplarily, it will be check whether there is any abnormality in a length of the data chain; whether parameters representing the data chain exceed a preset threshold; and whether a proportion of bad frames in the data chain exceeds a preset threshold. Different branches may be entered based on a judgement path, and the value of the error check bit of the verification data chain may be set to 1. If there are no abnormalities, a next step may be proceeded.

Step S116: determining whether the verification data chain is abnormal by verifying the plurality of check bits of the verification data chain to check whether the communication error exists in the vehicle-carried data of the target vehicle.

Exemplarily, it is checked whether there is any abnormality in the head check bit of the verification data chain and whether there is any abnormality in the end check bit of the verification data chain.

Based on verification results of the head check bit of the verification data chain and the end check bit of the verification data chain, if there is an error, the value of the error check bit of the verification data chain may be set to 1; if there are no error, the value of the error check bit of the verification data chain may be set to 0.

In an exemplary embodiment of the present application, the data chain with the value of the error check bit of the verification data chain set to 1 may be stored in an error buffer (byte length data). The error buffer may generate a certain number (default 2048) of error segments in an error storage space according to configuration, that is, a predefined available memory area.

A coupling bit calculation is performed on the head check bit of the verification data chain, the end check bit of the verification data chain, and the error check bit of the verification data chain. Exemplarily, a coupling bit AND operation is performed on the head check bit of the verification data chain and the end check bit of the verification data chain to obtain a value, and the value is add to a value of the error check bit of the verification data chain to obtain a value of the feedback check bit of the verification data chain as the last bit of the verification data chain. The value of the feedback check bit of the verification data chain may be sent to the external device corresponding to the payload ID. The external device performs device inspection based on the value of the feedback check bit of the verification data chain. If there are no error in the data chain, the external device may be instructed to continue data transmission; if there is an error in the data chain, the external device may be instructed to pause transmission, reshape the data chain, perform self-inspection according to an error code, and re-transmit the data chain.

Finally, only if the data chain transmitted by the external device corresponding to the payload ID has no errors during all verification processes, the data chain information will be considered as correct and adopted by the system to enter a positive response. Otherwise, it is considered that a communication error exists in the vehicle-carried data of the target vehicle, and the communication error is handled by the following steps, including: entering a corresponding addressing code space for abnormal function, or stop sending the data chain, or obtaining a negative feedback response to reshape the data chain.

According to a solution provided by the embodiment mentioned above, a complete verification is performed on the data chain through the check bits of the verification data chain for correct transmission. Meanwhile, different communication errors correspond to different processing methods, facilitating classification of the communication errors, and subsequent analysis and processing of the communication errors.

The embodiment of the present application shown in FIG. 3 will be further explained with reference to the flowchart shown in FIG. 4.

Figure 4:
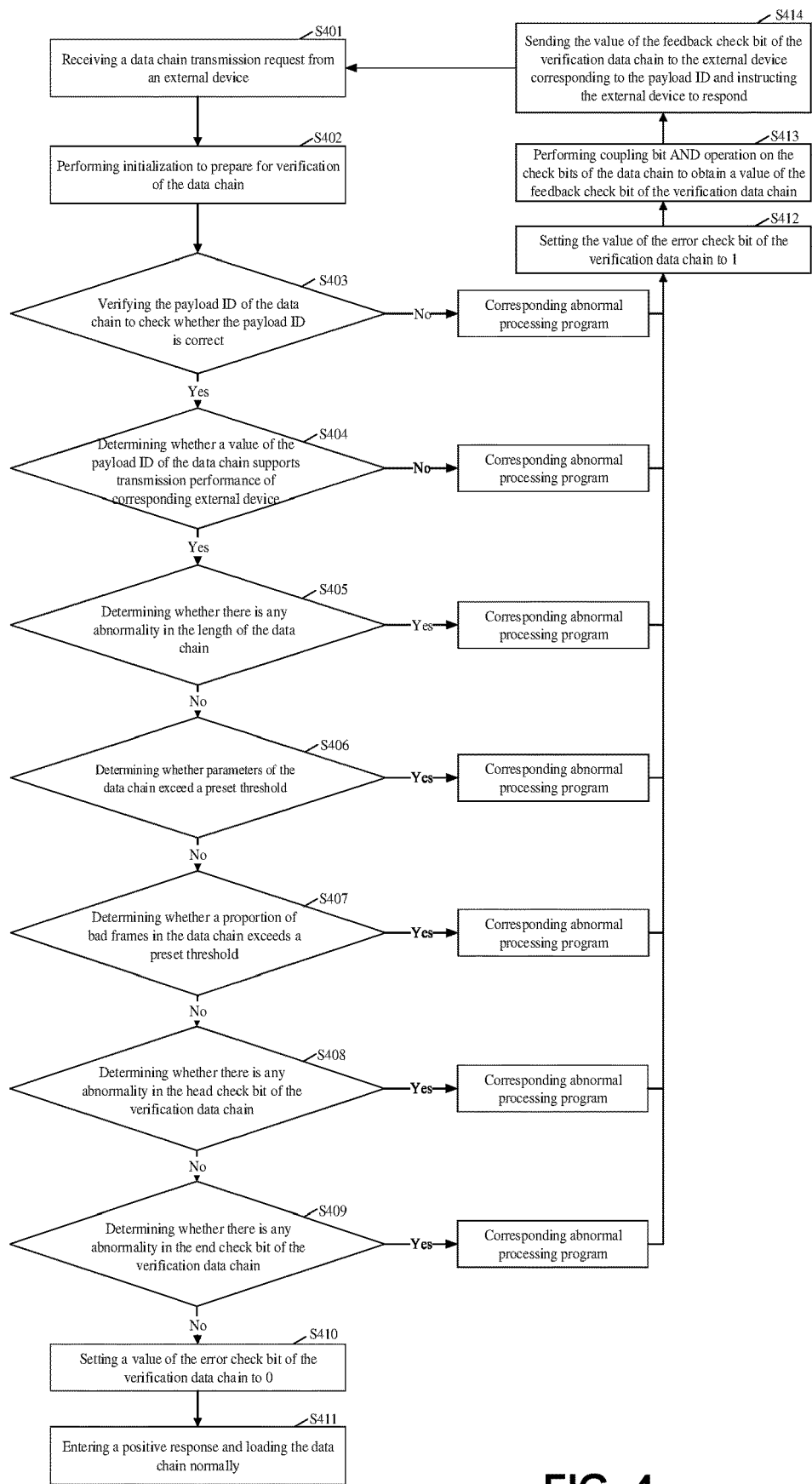
FIG. 4 is a flowchart of verifying a verification data chain according to the data processing method provided in FIG. 3.

As shown in FIG. 4, after Step S401: receiving a data chain transmission request from an external device, and Step S402 is executed, that is, performing initialization to prepare for verification of the data chain.

Exemplarily, during the initialization process, connection of physical layer for the data chain communication is ensured to be normal through a check code. If an initialized connection between the SOC core processor and other devices fails, a procedure for processing abnormal devices will be performed to report error information of device node.

Step S403: verifying the payload ID of the data chain to check whether the payload ID is correct. If so, Step S404 is executed; if not, a next procedure of judgement may be performed based on an addressing code and Step S412 is executed.

Step S404: determining whether a value of the payload ID of the data chain supports transmission performance of a corresponding external device, that is, verifying consistency between an inherent redundant data chain of a data chain transmission protocol and signal information of the data chain of each frame. If so, Step S405 is executed; if not, a next procedure of judgement may be performed based on an addressing code and Step S412 is executed.

Step S405: determining whether there is any abnormality in a length of the data chain. If not, Step S406 is executed; if so, a next procedure of judgement may be performed based on an addressing code and Step S412 is executed.

Step S406: determining whether parameters of the data chain exceed a preset threshold. If not, Step S407 is executed; if so, a next procedure of judgement may be performed based on an addressing code and Step S412 is executed.

Step S407: determining whether a proportion of bad frames in the data chain exceeds a preset threshold. If not, Step S408 is executed; if so, a next procedure of judgement may be performed based on an addressing code and Step S412 is executed.

Step S408: determining whether there is any abnormality in the head check bit of the verification data chain. If not, Step S409 is executed; if so, a next procedure of judgement may be performed based on an addressing code and Step S412 is executed.

Step S409: determining whether there is any abnormality in the end check bit of the verification data chain. If not, Step S410 is executed; if so, a next procedure of judgement may be performed based on an addressing code and Step S412 is executed.

Step S410: setting a value of the error check bit of the verification data chain to 0, and executing Step S411.

Step S411: entering a positive response and loading the data chain normally.

Step S412: setting the value of the error check bit of the verification data chain to 1, and executing Step S413.

Step S413: performing coupling bit AND operation on the check bits of the data chain to obtain a value of the feedback check bit of the verification data chain, and executing Step S414.

Step S414: sending the value of the feedback check bit of the verification data chain to the external device corresponding to the payload ID and instructing the external device to respond. If there are no error in the feedback check bit of the verification data chain, the data chain is continued to be transmitted; if there is an error in the feedback check bit of the verification data chain, transmission of the data chain is stopped, the data chain is reshaped, self-inspection is performed according to an error code, and the data chain is re-transmitted.

Figure 5:
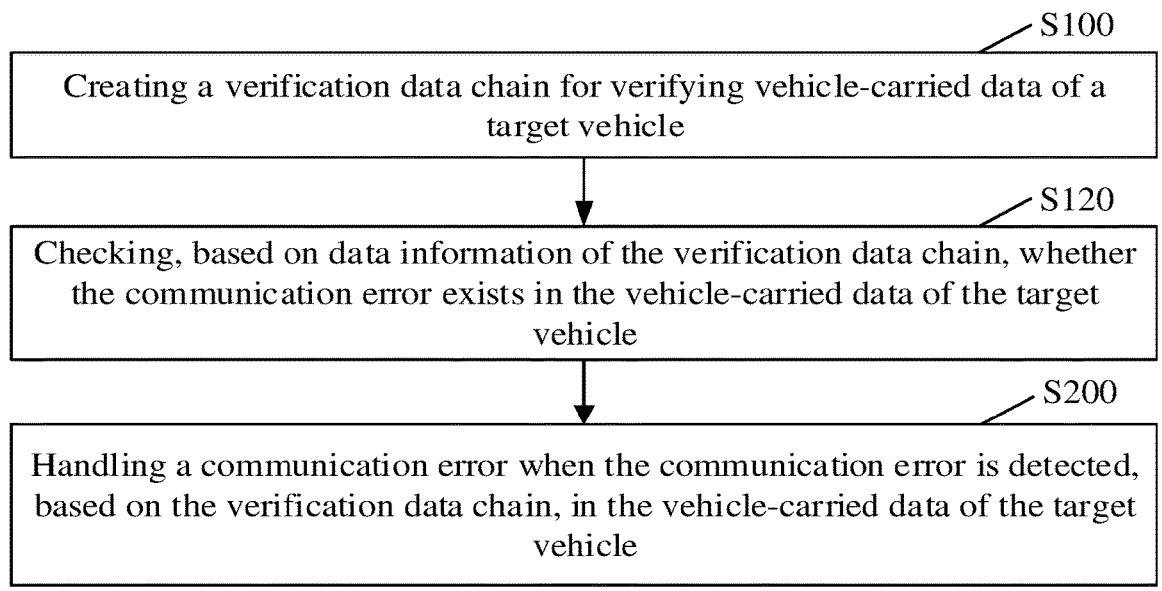
FIG. 5 is a flowchart of a data processing method according to yet still another embodiment of the present application.

FIG. 5 is a flowchart of a data processing method according to yet still another embodiment of the present application. The embodiment shown in FIG. 5 is an extension of the embodiment shown in FIG. 1. A difference between the embodiment shown in FIG. 5 and the embodiment shown in FIG. 1 will be described below, and the similarities are not described herein again.

As shown in FIG. 5, in the embodiment of the present application, before the handling a communication error when the communication error is detected in the vehicle-carried data of the target vehicle based on the verification data chain, the method further includes the following steps.

Step S120: checking, based on data information of the verification data chain, whether the communication error exists in the vehicle-carried data of the target vehicle.

Figure 6:
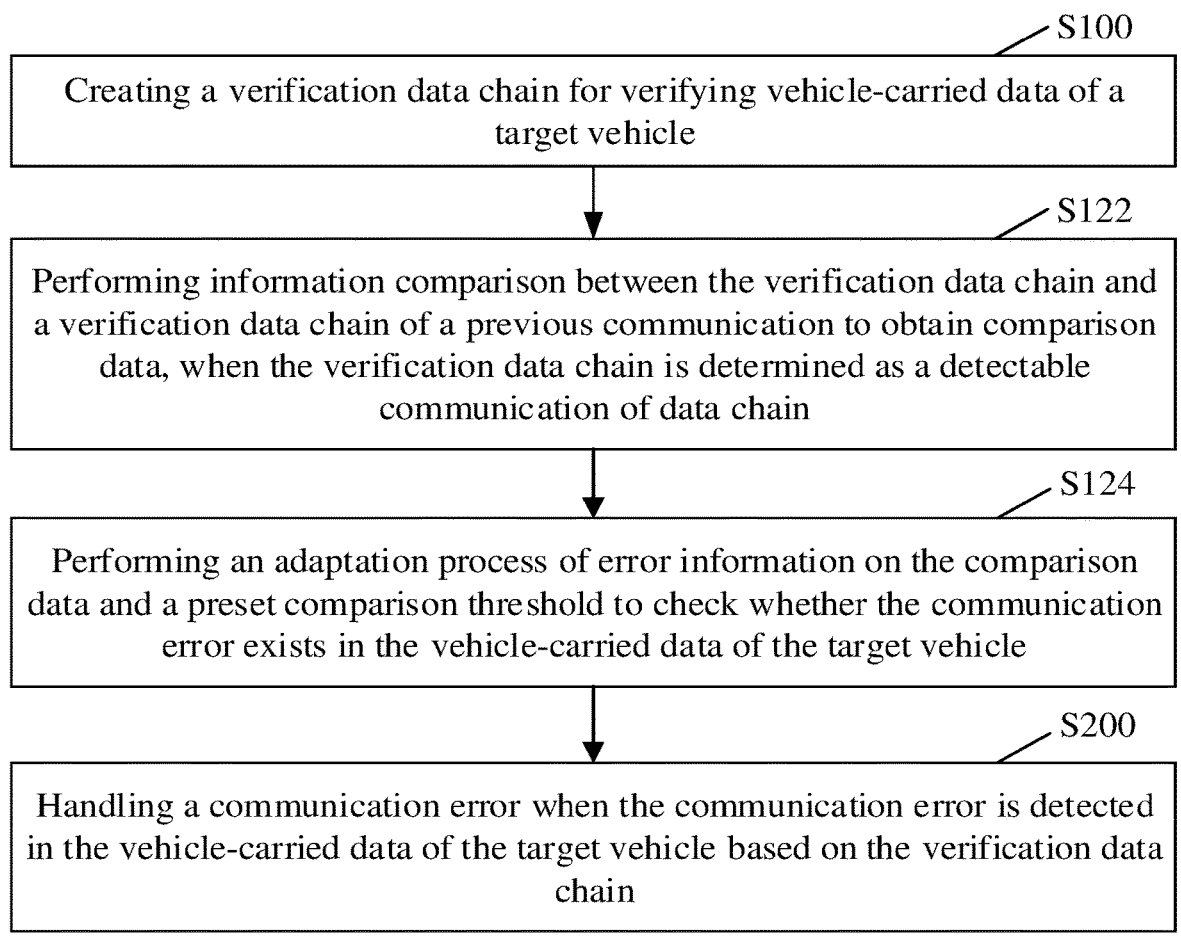
FIG. 6 is a flowchart of a data processing method according to yet still another embodiment of the present application.

In an exemplary embodiment of the present application, Step S120: checking, based on data information of the verification data chain, whether the communication error exists in the vehicle-carried data of the target vehicle includes the following steps, as shown in FIG. 6, and the similarities with the embodiment shown in FIG. 5 are not described herein again.

Step S122: performing information comparison between the verification data chain and a verification data chain of a previous communication to obtain comparison data, when the verification data chain is determined as a detectable communication of data chain.

Exemplarily, a specific device signal input may be analyzed to determine whether a current communication data is a detectable data chain communication when system software is run. And information comparison may be performed between the current communication data and communication data of a previous communication, including bit comparison of communication data, format comparison of communication data, verification code comparison of communication data and so on. A combination operation may be further performed on values obtained from comparison.

Step S124: performing an adaptation process of error information on the comparison data and a preset comparison threshold to check whether the communication error exists in the vehicle-carried data of the target vehicle.

Exemplarily, the adaptation process of error information is performed on a value obtained from the combination operation and a configurable preset comparison threshold, and the process is related to communication data to be transmitted. A corresponding security priority level may be set first. Therefore, the preset comparison threshold may be smaller for a communication device of high safety and high reliability, so that it may be checked whether the communication error exists in the vehicle-carried data of the target vehicle.

In an exemplary embodiment of the present application, during the adaptation process of error information on the value obtained from the combination operation and the configurable preset comparison threshold, if the value obtained from the combination operation is out of a standard threshold, it indicates that there is a communication error detected in the vehicle-carried data of the target vehicle, and the data chain will not be output; if the value obtained from the combination operation is within the standard threshold, on the one hand, adapted data will be output, and on the other hand, a feedback will be sent to a real-time signal processing unit through self-inspection of a signal testing unit. The adapted data will be optimized by the real-time signal processing unit and optimized data may be used as previous data to re-compare with subsequent input data.

In this way, a closed-loop design for the process of checking communication errors is achieved through repeated circulation of the communication data. In addition, through a combined calculation on the data chain position comparison, data chain format comparison, and data chain verification code comparison, a judgment of data errors is more accurate and refined. Meanwhile, the output signal is performed optimization and feedback processing, thereby achieving the comparison between the pre-value data and a current data and enhancing the stability of data error detection.

Figure 7:
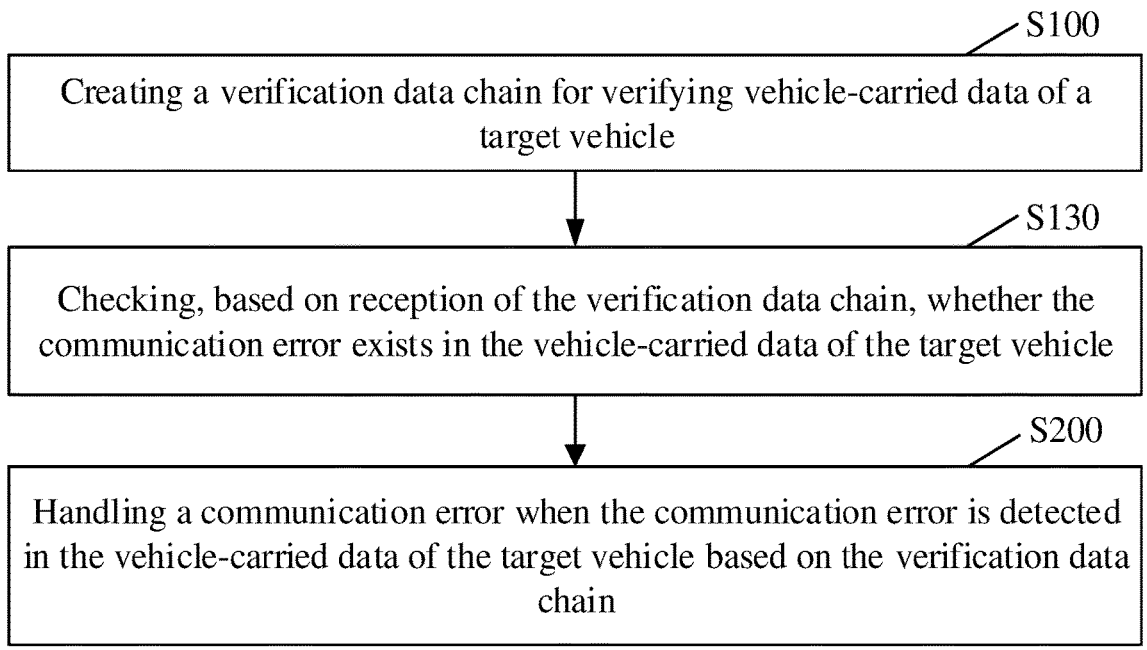
FIG. 7 is a flowchart of a data processing method according to yet still another embodiment of the present application.

FIG. 7 is a flowchart of a data processing method according to yet still another embodiment of the present application. The embodiment shown in FIG. 7 is an extension of the embodiment shown in FIG. 1. A difference between the embodiment shown in FIG. 7 and the embodiment shown in FIG. 1 will be described below, and the similarities are not described herein again.

As shown in FIG. 7, in the embodiment of the present application, before the handling a communication error when the communication error is detected in the vehicle-carried data of the target vehicle based on the verification data chain, the method further includes the following steps.

Step S130: checking, based on reception of the verification data chain, whether the communication error exists in the vehicle-carried data of the target vehicle.

Exemplarily, if the SOC core processor detects that the communication data sent by a sensor is not received within a preset time period, an external detection device will be notified to establish a detection communication connection with the control system through a regular detection communication, and select a corresponding detection measure. For example, when a laser radar sensor is working and a certain amount of blank areas appear in a scanned 3D image, this fault information will be read out and displayed on the upper protocol stack of the system software.

Figure 8:
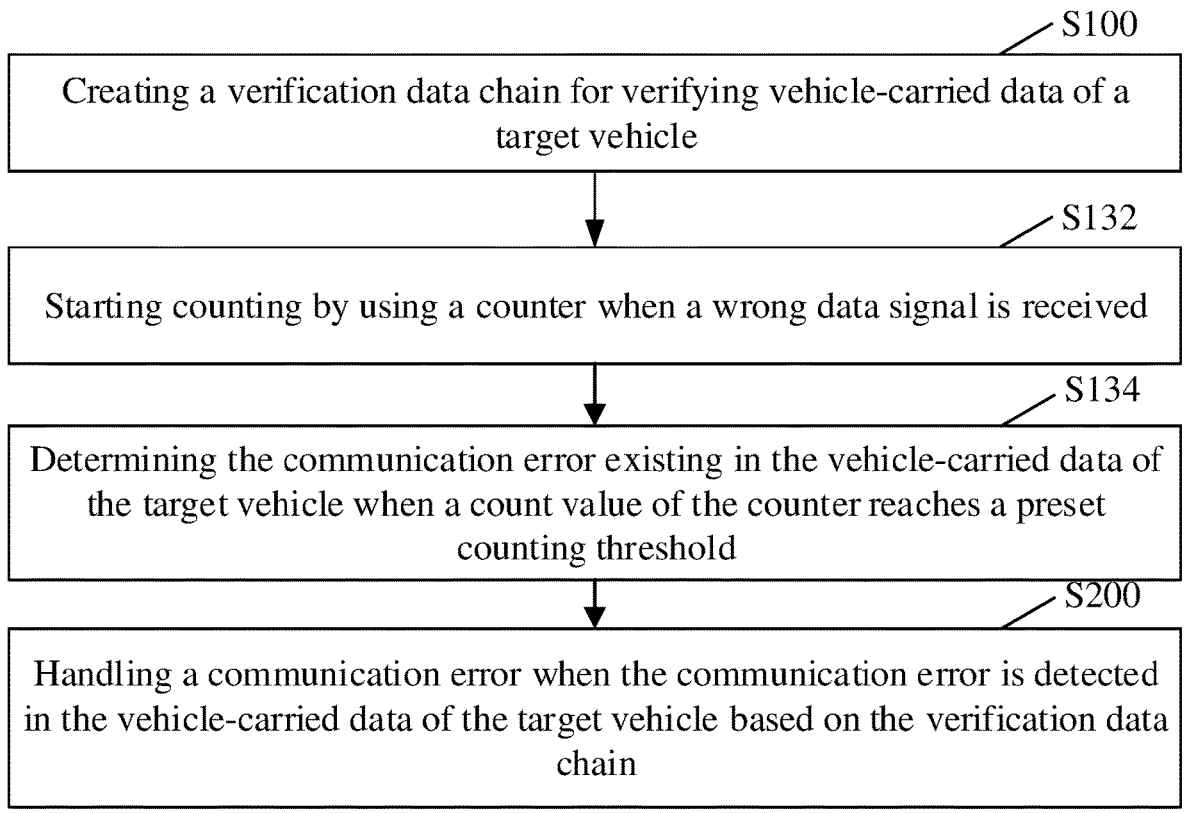
FIG. 8 is a flowchart of a data processing method according to yet still another embodiment of the present application.

In an exemplary embodiment of the present application, Step S130: checking, based on reception of the verification data chain, whether the communication error exists in the vehicle-carried data of the target vehicle includes the following steps as shown in FIG. 8, and the similarities with the embodiment shown in FIG. 7 are not described herein again.

Step S132: starting counting by using a counter when a wrong data signal is received.

Exemplarily, as shown in FIG. 9, a communication error detection is performed in a standard time cycle. When the system software starts communication, an error monitoring will be performed on the communication for each standard time period, such as 50 ms. At this time, the counter will start counting from 0. If no communication error is detected during a standard time cycle, the value of the counter will be reduced by 1 and the action will be repeated in the next standard time cycle; when the counter continues to be decrease by 1 to reach a preset lower limit threshold of −128, as shown in FIG. 9, the decrease by 1 operation will no longer be performed, but will remain at the value of −128, as shown in Number 3 in FIG. 9.

When an error signal of data is detected, the counter may return to zero and start counting again from 0. If error signals of the data chain are detected continuously, the value of the counter keeps accumulating.

Step S134: determining the communication error existing in the vehicle-carried data of the target vehicle when a count value of the counter reaches a preset counting threshold.

Exemplarily, as shown in an area marked by Number 5 of FIG. 9, when the count value of the counter reaches to a pre-set threshold of 127, communication needs to be adjusted to eliminate the communication error. And when the communication error is eliminated, the counter may return to zero. When communication of a data chain is completed, the counter may be reset to zero and start counting at the beginning of a next communication of a data chain, as shown in driving cycle 2 of FIG. 9. In addition, if detection of the error register stops during a certain period of time, the count value remains unchanged.

Exemplarily, images obtained from a camera sensor during a certain time period may serve as a data chain for communication. The driving cycle represents a cycle of obtaining images of a certain length of time from the camera sensor.

Preferably, different count ranges may be set for different vehicle systems. If there are many data error signals, the count range may be set to be small, such as a range of (−256, 255); if there are fewer communication errors, the count range may be set to be large, such as a range of (−1024, 1023). At the same time, configuration and modification of the count range both require a highest authority of the vehicle system.

According to a solution provided by the embodiment of the present application, detection on reception of the data chain is provided to detect communication errors timely, such as data loss issues during reception. A count range may also be configured flexibly according to different data transmission situations to ensure safety and reliability of the system, so that communication errors may be handled under different security requirements accordingly.

After communication errors are detected through the embodiments mentioned above, it is necessary to handle the communication errors.

FIG. 10 is a flowchart of a data processing method according to yet still another embodiment of the present application. The embodiment shown in FIG. 10 is an extension of the embodiment shown in FIG. 1. A difference between the embodiment shown in FIG. 10 and the embodiment shown in FIG. 1 will be described below, and the similarities will not be described herein again.

Step S210: storing the communication error in an error register when the communication error is detected, based on the verification data chain, in the vehicle-carried data of the target vehicle.

The communication error includes an error status recorded in a form of an error code.

Exemplarily, when the communication error occurs, except recording of the communication error performed by the counter, it is necessary to analyze and classify the communication error to handle the communication error.

A functional security communication protocol is provided for data interaction of the vehicle driving assistance system and is used to define a communication specification of error judgment for each sensor device based on its special function. An error analysis mechanism is provided based on the communication specification according to an embodiment of the present application.

When a communication error occurs, error information may be recorded in an error register in a specific form and may also be transmitted to an internal detection program in a form of error communication. The internal detection program within the system may read the error information in a form of detection communication.

When a communication error occurs, the error information may be stored in the error register in a form of an error code, and the internal detection program may identify the error through the error information corresponding to the error code. Different communication errors of the data chain are configured with different error codes.

In an exemplary embodiment of the present application, a specific fault mode, fault flag, and other information of the error may also be stored in the error register. For example, records of a millimeter wave sensor fault and a laser radar sensor fault in the vehicle system are different, so that the faults may not be confused. An error status of data represents a current state of an error of the data. The error status of data consists of 8 data bits, where each bit represents a different fault status.

A set of error codes in the error register represents errors occurred in different systems of the vehicle system. There is no limitation on sensor types defined by the error register. For example, the sensor types may include a LiDAR sensor, a high-definition camera sensor, a millimeter wave sensor, a combined navigation sensor, and so on. With a rapid development of overall complexity of the vehicle driving assistance system, more communication error codes and types may be defined.

FIG. 11 is a schematic diagram of an error code according to an embodiment of the present application. Specifically, as shown in FIG. 11, each error code includes 8 bytes, and each byte represents a different meaning. Specifically, the first byte represents a mask of an error register status, configured to represent a status of the error register. The second and third bytes represent a service request type of data chain communication. The fourth and fifth bytes represent all bits set to 1 of the error register. The sixth and seventh bytes represent a count value bit of communication errors. The eighth byte represents a read/write status of the data chain error.

Contents represented by the error code shown in FIG. 11 is explained as follows. The first byte is A, representing that the communication error status register corresponds to a camera sensor.

The second and the third bytes are 1 and 4 respectively, indicating that a service request type of data chain communication of the camera sensor is non-coding, and coded value exceeds a state value of a coding range.

The fourth and fifth bytes are 7 and E respectively, indicating that bits of 7E of the communication error status register of the camera sensor are set to 1.

The sixth and seventh bytes are 8 and 8 respectively, indicating that the count value of the communication error of the camera sensor is 8 and the communication error occurs in the eighth column of the camera sensor.

The eighth byte is 0, indicating that the read/write state of the communication error of the camera sensor is readable only.

By reading the error code from the error register, the status of the communication error may be obtained, and every byte and bit of the communication error may be analyzed, so that a strategy for detecting and recording communication errors in vehicle-carried data may be improved, thereby greatly improving reliability and a constraint ability of on-board Ethernet network communication.

Figure 12:
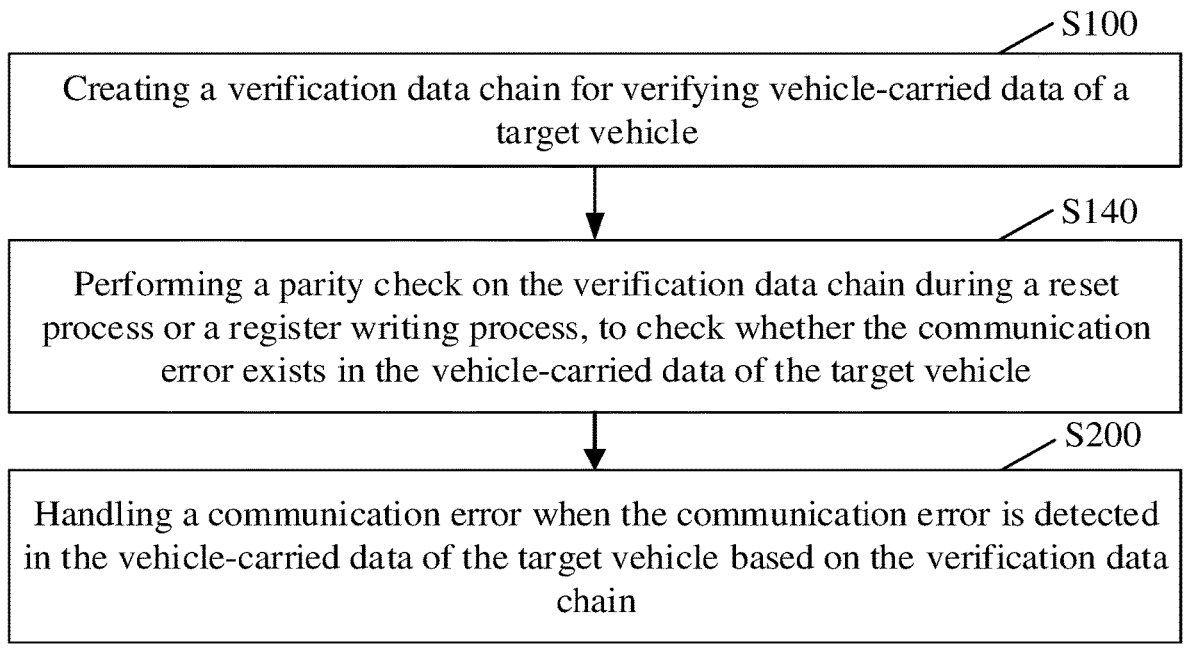
FIG. 12 is a flowchart of a data processing method according to yet still another embodiment of the present application.

FIG. 12 is a flowchart of a data processing method according to yet still another embodiment of the present application. The embodiment shown in FIG. 12 is an extension of the embodiment shown in FIG. 1. A difference between the embodiment shown in FIG. 12 and the embodiment shown in FIG. 1 will be described below, and the similarities are not described herein again.

As shown in FIG. 12, in the embodiment of the present application, before the handling a communication error when the communication error is detected in the vehicle-carried data of the target vehicle based on the verification data chain, the method further includes the following steps.

Step S140: performing a parity check on the verification data chain during a reset process or a register writing process, to check whether the communication error exists in the vehicle-carried data of the target vehicle.

Specifically, a parity check protection mechanism is provided through NOC parity check technology to detect unit flipping that may occur over time due to transient errors in register storage components. The NOC parity check is performed during the reset process or the register writing process. When a clock of a device is activated, the parity value is checked within every clock cycle to ensure the integrity and functional safety of the transmission data chain.

In an exemplary embodiment of the present application, if a sudden or a transient error occurs during transmission and is detected through the NOC parity check (including all NOC transmission units), a data chain firewall or data chain disconnection may be used to detect some faults which may occur during a refining process on the data chain. Two dedicated recovery mechanisms for the data chain are formed based on the data chain firewall or data chain disconnection.

Mechanism 1: performing a payload ID parity check on the head check bit of the verification data chain or the end check bit of the verification data chain, or performing the payload ID parity check on the head check bit of the verification data chain and performing a parity check on the end check bit of the verification data chain. To ensure effectiveness of the check performed on the head check bit of the verification data chain or the end check bit of the verification data chain, it is also necessary to perform an effectiveness check on the payload ID to confirm activation.

Mechanism 2: performing parity redundancy check on the head check bit of the verification data chain, the end check bit of the verification data chain, and the payload ID parity check, that is, inserting some separate data chain fields during a refining process of the data chain, and performing parity check on the head check bit of the verification data chain and the end check bit of the verification data chain, and the payload ID parity check.

Figure 13:
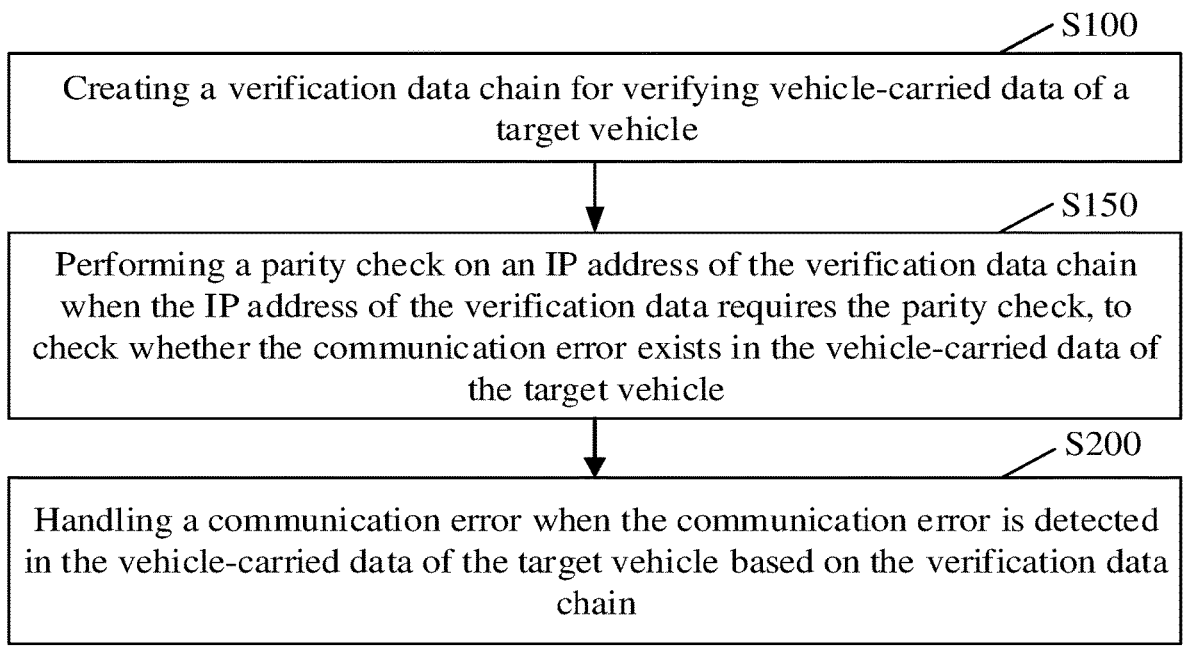
FIG. 13 is a flowchart of a data processing method according to yet still another embodiment of the present application.

FIG. 13 is a flowchart of a data processing method according to yet still another embodiment of the present application. The embodiment shown in FIG. 13 is an extension of the embodiment shown in FIG. 1. A difference between the embodiment shown in FIG. 13 and the embodiment shown in FIG. 1 will be described below, and the similarities are not described herein again.

As shown in FIG. 13, in the embodiment of the present application, before the handling a communication error when the communication error is detected in the vehicle-carried data of the target vehicle based on the verification data chain, the method further includes the following steps.

Step S150: performing a parity check on an IP address of the verification data chain when the IP address of the verification data requires the parity check, to check whether the communication error exists in the vehicle-carried data of the target vehicle.

Exemplarily, parity protection is added to the IP address with parity check requirements. If a parity check error is detected, an interruption of parity check will be generated immediately, and a parity check status will be recorded. After the interruption is handled, the parity check status may be cleared.

In an exemplary embodiment of the present application, the parity check function of the IP address is provided with a dedicated parity check control register, which includes parity check enabling, parity check interruption, interruption clearing, and error injection. In addition, the parity check of the IP address is performed before initialization.

Figure 14:
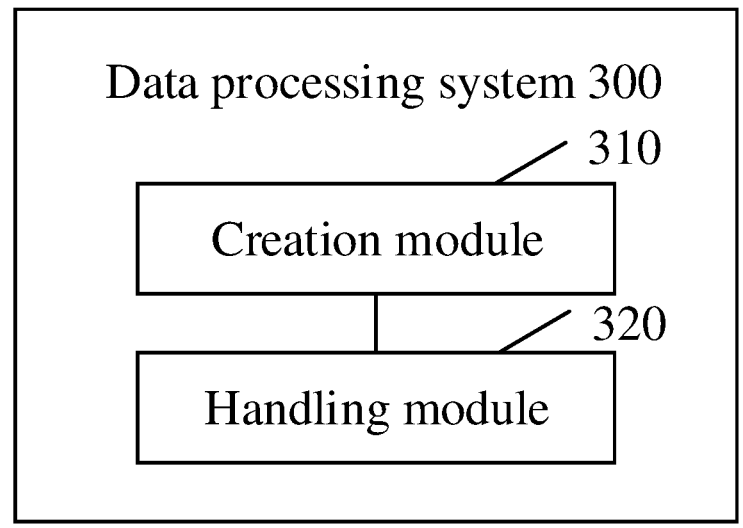
FIG. 14 is a structural diagram of a data processing system according to an embodiment of the present application.

FIG. 14 is a structural diagram of a data processing system according to an embodiment of the present application. As shown in FIG. 14, the data processing system 300 provided in the embodiment of the present application includes a creation module 310 and a handling module 320.

Specifically, the creation module 310 is configured to create a verification data chain for verifying vehicle-carried data of a target vehicle, where the verification data chain includes a plurality of check bits. The handling module 320 is configured to handle a communication error when the communication error is detected in the vehicle-carried data of the target vehicle based on the verification data chain.

In an embodiment of the present application, before the handling module 320 performs the step: handling a communication error when the communication error is detected in the vehicle-carried data of the target vehicle based on the verification data chain, it is also configured to perform at least one of following steps:

checking, based on the plurality of check bits in the verification data chain, whether the communication error exists in the vehicle-carried data of the target vehicle;

checking, based on data information of the verification data chain, whether the communication error exists in the vehicle-carried data of the target vehicle; and checking, based on reception of the verification data chain, whether the communication error exists in the vehicle-carried data of the target vehicle.

In an embodiment of the present application, the creation module 310 creates the verification data chain for the verifying vehicle-carried data of the target vehicle, and the check bits includes at least one of following:
- a head check bit of the verification data chain, located at a head of the verification data chain and configured to record basic information of the verification data chain;
- an end check bit of the verification data chain, located at an end of the verification data chain and configured to perform a weighting calculation on the plurality of check bits;
- an error check bit of the verification data chain, configured to report an error status of the verification data chain; and
- a feedback check bit of the verification data chain, obtained by a coupling calculation performed on the head check bit, the end check bit, and the error check bit of the verification data chain In an embodiment of the present application, before the handling module 320 performs the step: handling a communication error when the communication error is detected in the vehicle-carried data of the target vehicle based on the verification data chain, it is also configured to determine whether a payload ID of the verification data chain is correct through a parity check of the payload ID to check whether the communication error exists in the vehicle-carried data of the target vehicle; verify parameters of the verification data chain to check whether the communication error exists in the vehicle-carried data of the target vehicle; and determine whether the verification data chain is abnormal by verifying the plurality of check bits of the verification data chain to check whether the communication error exists in the vehicle-carried data of the target vehicle.

In an embodiment of the present application, before the handling module 320 performs the step: handling a communication error when the communication error is detected in the vehicle-carried data of the target vehicle based on the verification data chain, it is also configured to perform information comparison between the verification data chain and a verification data chain of a previous communication to obtain comparison data when the verification data chain is determined as a detectable communication of data chain; and perform an adaptation process of error information on the comparison data and a preset comparison threshold to check whether the communication error exists in the vehicle-carried data of the target vehicle.

In an embodiment of the present application, before the handling module 320 performs the step: handling a communication error when the communication error is detected in the vehicle-carried data of the target vehicle based on the verification data chain, it is also configured to start counting by using a counter when a wrong data signal is received; and determine a communication error to be eliminated when a count value of the counter reaches a preset counting threshold.

In an embodiment of the present application, the handling module 320 is also configured to the communication error in an error register, where the communication error includes an error status recorded in a form of an error code.

In an embodiment of the present application, before the handling module 320 performs the step: handling a communication error when the communication error is detected in the vehicle-carried data of the target vehicle based on the verification data chain, it is also configured to perform a parity check on the verification data chain during a reset process or a register writing process, to check whether the communication error exists in the vehicle-carried data of the target vehicle.

In an embodiment of the present application, the handling module 320 is also configured to generate a parity interrupt to handle the communication error.

In an embodiment of the present application, before the handling module 320 performs the step: handling a communication error when the communication error is detected in the vehicle-carried data of the target vehicle based on the verification data chain, it is also configured to perform a parity check on an IP address of the verification data chain when the IP address of the verification data requires the parity check, to check whether the communication error exists in the vehicle-carried data of the target vehicle.

Figure 15:
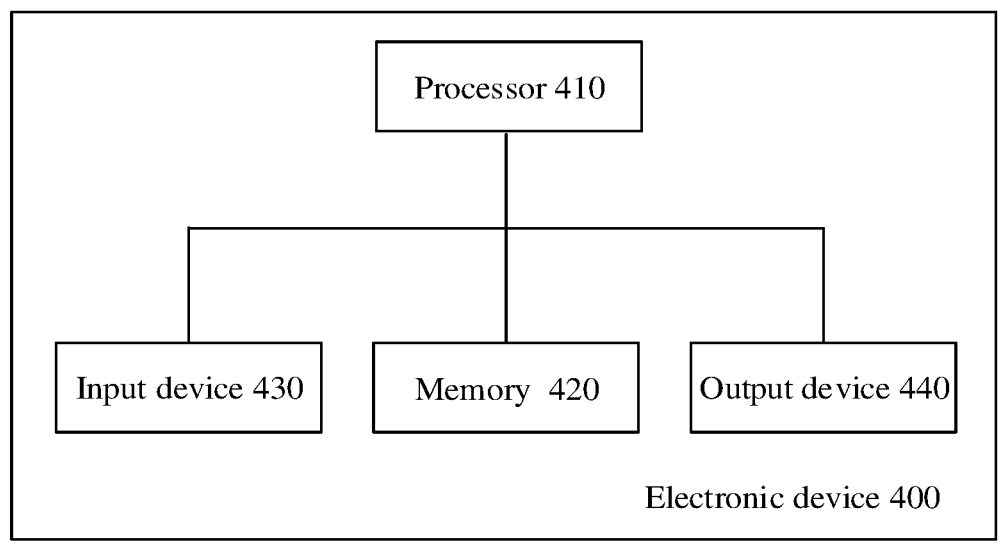
FIG. 15 is a schematic structural diagram of an electronic device according to an embodiment of the present application.

FIG. 15 is a schematic structural diagram of an electronic device according to an embodiment of the present application. As shown in FIG. 15, the electronic device 400 includes one or more processors 410 and memories 420.

The processor 410 may be a central processing unit (CPU) or other form of processing unit with data processing and/or instruction execution capability, and may control other components in the electronic device 400 to perform desired functions.

The memory 420 may include one or more computer program products, which may include various forms of computer-readable storage mediums, such as a volatile memory and/or a non-volatile memory. The volatile memory may include, for example, a random access memory (RAM) and/or a cache memory (Cache). The non-volatile memory may include, for example, a read only memory (ROM), hard disk, a flash memory and so on. One or more computer program instructions may be stored in the computer-readable storage medium, and the processor 410 may run the program instructions to realize the steps and/or other desired functions of the parameter determination method according to the embodiments of the present application. And the computer-readable storage medium may further store various contents such as a communication error of a verification data chain.

In an example, the electronic device 400 may also include an input device 430 and an output device 440. These components are interconnected by a bus system and/or other forms of connection mechanism (not shown).

The input device 430 may also include, for example, a keyboard, a mouse, and so on.

The output device 440 may output various kinds of information, such as a communication error of a verification data chain, to the outside. The output device 440 may include, for example, a display, a speaker, a printer, a communication network and remote output device connected on it, and so on.

To simplify, only some of the components related to the present application in the electronic device 400 are shown in FIG. 15 and components such as bus, input/output interface and so on are omitted. Moreover, the electronic device 400 may also include any other appropriate components according to the specific application.

Beyond the above methods and devices, the embodiments of the present application may also be computer program products, such as computer program instructions, where the steps of the data processing method as described in any one of above embodiments may be performed when the instructions are run by the processor.

The computer program product may write program code for executing the operation of the embodiments of the present application in any combination of one or more programming languages. The programming languages include object-oriented programming languages, such as Java, C++, and also include conventional procedural programming languages, such as "C" language or similar programming languages. The program code may be completely executed on a user computing device, partially executed on the user device, executed as an independent software package, partially executed on the user computing device and partially executed on a remote computing device, or completely executed on the remote computing device or processor.

A basic principle of the present application is described with reference to specific embodiments. However, it should be noted that advantages, superiorities, effects and so on mentioned in the present application are only examples, but not limitations. It cannot be considered that these advantages, superiorities, effects and so on are necessary for each embodiment of the present application. In addition, the specific details disclosed above are only for the purpose of example and easy understanding, but not for limitation. The present application is not limited to the above specific details.

Block diagrams of devices, apparatuses, equipment and systems involved in the present application are only illustrative examples and are not intended to require or imply that they must be connected, disposed and configured in the manner shown in the block diagram. As those skilled in the art will recognize that these devices, apparatuses, equipment and systems may be connected, disposed and configured in any way. The terms such as "include", "contain", "have" and so on are open-class words, and referring to "include but not limited to", and can be used interchangeably. The terms "or" and "and" refer to the terms "and/or" and can be used interchangeably, unless the context clearly indicate otherwise. The term "such as" refers to the terms "such as but not limited to" and can be used interchangeably.

It should also be noted that each component or step in the apparatus, device and method of the present application can be decomposed and/or reassembled. The decomposition and/or recombination shall be considered as the equivalent of the present application.

The above description of the disclosed aspects is provided to enable any person skilled in the art to make or use the present application. Any modification to these aspects is obvious to a person skilled in the art, and the general principles defined herein can be applied to other aspects without departing from the protection scope of the present application. Therefore, the present application is not intended to be limited to the aspects shown herein, but to the widest range consistent with the principles and novel features disclosed herein.

The above embodiments are only preferred embodiments of the present application, and are not intended to limit the protection scope of the present application. Any modification, equivalent replacement, improvement and so on made in the spirit and principle of the present application shall fall into the protection scope of the present application.

What is claimed is:

1. A computer-implemented method, comprising:
   creating, by a computer, a verification data chain for verifying vehicle-carried data of a target vehicle, wherein the verification data chain comprises a plurality of check bits;
   transmitting, over an in-vehicle Ethernet network, the verification data chain through a linked list of verification data;
   performing a parity check on the verification data chain during a reset process or a register writing process to check whether a communication error exists in the vehicle-carried data of the target vehicle; and
   handling the communication error by generating a parity interrupt in response to detecting the communication error in the vehicle-carried data of the target vehicle.

2. The computer-implemented method according to claim 1, further comprising at least one of the following:
   checking, based on the plurality of check bits in the verification data chain, whether the communication error exists in the vehicle-carried data of the target vehicle;
   checking, based on data information of the verification data chain, whether the communication error exists in the vehicle-carried data of the target vehicle; and
   checking, based on reception of the verification data chain, whether the communication error exists in the vehicle-carried data of the target vehicle.

3. The computer-implemented method according to claim 2, wherein the plurality of check bits comprise at least one of the following:
   a head check bit of the verification data chain, located at a head of the verification data chain and configured to record basic information of the verification data chain;
   an end check bit of the verification data chain, located at an end of the verification data chain and configured to perform a weighting calculation on the plurality of check bits;
   an error check bit of the verification data chain, configured to report an error status of the verification data chain; and
   a feedback check bit of the verification data chain, obtained by a coupling calculation performed on the head check bit, the end check bit, and the error check bit of the verification data chain.

4. The computer-implemented method according to claim 2, wherein checking, based on the plurality of check bits in the verification data chain, whether the communication error exists in the vehicle-carried data of the target vehicle comprises:
   determining whether a payload ID of the verification data chain is correct through a second parity check of the payload ID to check whether the communication error exists in the vehicle-carried data of the target vehicle;
   verifying a parameter of the verification data chain to check whether the communication error exists in the vehicle-carried data of the target vehicle; and
   determining whether the verification data chain is abnormal by verifying the plurality of check bits of the verification data chain to check whether the communication error exists in the vehicle-carried data of the target vehicle.

5. The computer-implemented method according to claim 2, wherein checking, based on data information of the verification data chain, whether the communication error exists in the vehicle-carried data of the target vehicle comprises:
   performing information comparison between the verification data chain and a second verification data chain of a previous communication to obtain comparison data when the verification data chain is determined as a detectable data chain communication; and
   performing an adaptation process of error information on the comparison data and a preset comparison threshold to check whether the communication error exists in the vehicle-carried data of the target vehicle.

6. The computer-implemented method according to claim 2, wherein checking, based on reception of the verification data chain, whether the communication error exists in the vehicle-carried data of the target vehicle comprises:
- starting counting by using a counter when a wrong data signal is received; and
- determining the communication error existing in the vehicle-carried data of the target vehicle when a count value of the counter reaches a preset counting threshold.

7. The computer-implemented method according to claim 1, wherein handling the communication error further comprises:
- storing the communication error in an error register, wherein the communication error comprises an error status recorded in a form of an error code.

8. The computer-implemented method according to claim 1, wherein the linked list of verification data is configured to be dynamically expanded based on a size of the verification data chain.

9. The computer-implemented method according to claim 1, further comprising:
- performing a third parity check on an IP address of the verification data chain when the IP address of the verification data requires the third parity check, to check whether the communication error exists in the vehicle-carried data of the target vehicle.

10. A computer system, comprising:
a processor; and
a storage device storing instructions that when executed by the processor cause the processor to perform a method, the method comprising:
- creating a verification data chain for verifying vehicle-carried data of a target vehicle, wherein the verification data chain comprises a plurality of check bit;
- transmitting, over an in-vehicle Ethernet network, the verification data chain through a linked list of verification data;
- performing a parity check on the verification data chain during a reset process or a register writing process to check whether a communication error exists in the vehicle-carried data of the target vehicle; and
- handling the communication error by generating a parity interrupt in response to detecting the communication error in the vehicle-carried data of the target vehicle.

11. The computer system of claim 10, wherein the method further comprises at least one of:
- checking, based on the plurality of check bits in the verification data chain, whether the communication error exists in the vehicle-carried data of the target vehicle;
- checking, based on data information of the verification data chain, whether the communication error exists in the vehicle-carried data of the target vehicle; and
- checking, based on reception of the verification data chain, whether the communication error exists in the vehicle-carried data of the target vehicle.

12. The computer system of claim 11, wherein the plurality of check bits comprise at least one of the following:
- a head check bit of the verification data chain, located at a head of the verification data chain and configured to record basic information of the verification data chain;
- an end check bit of the verification data chain, located at an end of the verification data chain and configured to perform a weighting calculation on the plurality of check bits;
- an error check bit of the verification data chain, configured to report an error status of the verification data chain; and
- a feedback check bit of the verification data chain, obtained by a coupling calculation performed on the head check bit, the end check bit, and the error check bit of the verification data chain.

13. The computer system of claim 11, wherein checking, based on the plurality of check bits in the verification data chain, whether the communication error exists in the vehicle-carried data of the target vehicle further comprises:
- determining whether a payload ID of the verification data chain is correct through a second parity check of the payload ID to check whether the communication error exists in the vehicle-carried data of the target vehicle;
- verifying a parameter of the verification data chain to check whether the communication error exists in the vehicle-carried data of the target vehicle; and
- determining whether the verification data chain is abnormal by verifying the plurality of check bits of the verification data chain to check whether the communication error exists in the vehicle-carried data of the target vehicle.

14. The computer system of claim 11, wherein checking, based on data information of the verification data chain, whether the communication error exists in the vehicle-carried data of the target vehicle further comprises:
- performing information comparison between the verification data chain and a second verification data chain of a previous communication to obtain comparison data when the verification data chain is determined as a detectable data chain communication; and
- performing an adaptation process of error information on the comparison data and a preset comparison threshold to check whether the communication error exists in the vehicle-carried data of the target vehicle.

15. The computer system of claim 11, wherein checking, based on reception of the verification data chain, whether the communication error exists in the vehicle-carried data of the target vehicle further comprises:
- starting counting by using a counter when a wrong data signal is received; and
- determining the communication error existing in the vehicle-carried data of the target vehicle when a count value of the counter reaches a preset counting threshold.

16. The computer system of claim 10, wherein handling the communication error further comprises:
- storing the communication error in an error register, wherein the communication error comprises an error status recorded in a form of an error code.

17. The computer system of claim 10, wherein the linked list of verification data is configured to be dynamically expanded based on a size of the verification data chain.

18. A non-transitory computer-readable storage medium, configured to store a computer executable instruction, wherein when the executable instruction is executed by a processor, the processor performs a method comprising:
- creating a verification data chain for verifying vehicle-carried data of a target vehicle, wherein the verification data chain comprises a plurality of check bits;
- transmitting, over an in-vehicle Ethernet network, the verification data chain through a linked list of verification data;
- performing a parity check on the verification data chain during a reset process or a register writing process to check whether a communication error exists in the vehicle-carried data of the target vehicle; and handling a communication error by generating a parity interrupt in response to detecting the communication error in the vehicle-carried data of the target vehicle based on the verification data chain.

* * * * *